(12) United States Patent
Nakayama et al.

(10) Patent No.: US 6,257,561 B1
(45) Date of Patent: Jul. 10, 2001

(54) AIR SPRING

(75) Inventors: Kazuo Nakayama; Ichiro Maruyama; Hideki Kitada, all of Osaka; Takehiro Nishimura, Hyogo, all of (JP)

(73) Assignees: Sumitomo Electric Industries, Ltd., Osaka; Kawasaki Jukogyu Kabushiki Kaisha, Kobe, both of (JP)

( * ) Notice: Subject to any disclaimer, the term of this patent is extended or adjusted under 35 U.S.C. 154(b) by 0 days.

(21) Appl. No.: 09/332,952

(22) Filed: Jun. 15, 1999

(30) Foreign Application Priority Data

Jul. 16, 1998 (JP) .................................................. 10-201715

(51) Int. Cl.⁷ ....................................................... F16F 9/04
(52) U.S. Cl. .................................... 267/64.19; 267/64.27; 267/122; 267/35
(58) Field of Search .............................. 267/64.15, 64.16, 267/64.21, 64.23, 64.24, 64.27, 64.19, 35, 122; 280/DIG. 1, 124.157, 685

(56) References Cited

U.S. PATENT DOCUMENTS 5,921,532 * 7/1999 Pierce et al. ...................... 267/64.19

FOREIGN PATENT DOCUMENTS

| 48-9743 | 3/1973 | (JP) . |
| 48-35663 | 10/1973 | (JP) . |
| 56-119003 | 2/1980 | (JP) . |
| 61-116111 | 6/1986 | (JP) . |
| 4-262103 | 9/1992 | (JP) . |
| 9-89029 | 3/1997 | (JP) ................................. F16F/9/05 |

* cited by examiner

Primary Examiner—Robert J. Oberleitner
Assistant Examiner—Thomas J. Williams
(74) Attorney, Agent, or Firm—Sughrue, Mion, Zinn Macpeak & Seas, PLLC

(57) ABSTRACT

If the height of a train car is reduced by the regrinding of the tread of each wheel and then reincreased to the original level by simply increasing the height of air springs, the compression stroke of the air springs changes. An arrangement is proposed to maintain a constant compression stroke after height adjustment. A stopper has movement restricting portions arranged circumferentially at predetermined intervals for restricting the downward movement of the outer cylinder. The stopper is rotatably mounted on the inner member. The outer cylinder has surfaces to be supported, and second surfaces to be supported provided circumferentially alternating with the first surfaces at a level lower than the first surfaces such that when the stopper is turned, the restricting protrusions move from the position where they support the first surfaces to the position where they support the second surfaces. The stopper has a lever so that it can be turned by operating the lever from outside.

3 Claims, 5 Drawing Sheets

AIR SPRING

BACKGROUND OF THE INVENTION

This invention relates to an air spring having a height adjusting means for keeping constant the compressive deformation (or stroke).

When the treads of wheels of a railroad car are worn, they have to be reground. When they are reground, the car height reduces. With the railroad car having air springs, it is ordinary to increase its height to the original level after regrinding of the treads by interposing a shim between each air spring and the chassis of the car to keep constant the compressive stroke of the air springs to prevent changes in properties due to changes in the stroke.

An air spring proposed in unexamined Japanese patent publication 9-89029 has an upper and a lower face plate having stopper member's opposing each other. Each stopper member has a flat surface and a protrusion protruding toward the opposing stopper member. One of the stopper members is turnable.

With this air spring, the upper limit of the compression stroke when the protrusion of one of the stopper members is opposed to the flat surface of the other stopper member is equal to the upper limit of the compression stroke when said one of the stopper members is turned until the protrusions of both stopper members face each other and the air spring is inflated until its height increases by an amount equal to the height of the protrusions. Thus, by turning the stopper member during car height adjustment with the height of the protrusions of the stopper members adjusted to a value equal to the amount of car height adjustment, it is possible to maintain the same compression stroke after the car height adjustment as before.

In order to raise the entire air spring by interposing a shim, the air spring has to be dismounted from the chassis. This method is thus troublesome.

The two relatively turnable stopper members of the air spring of unexamined Japanese patent publication 9-89029 function as a kind of built-in shims. With this air spring, too, in order to turn one of the stopper members, the air spring has to be dismounted from the chassis. Height adjustment is thus troublesome.

An object of this invention is to solve these problems.

SUMMARY OF THE INVENTION

According to this invention, there is provided an air spring comprising an inner member, an outer cylinder, a bellows provided between the inner member and the outer cylinder, a stopper provided in the bellows and supported on the inner member and having a downward movement restricting portion for restricting the downward movement of the outer cylinder, a lower plate supporting the inner member, a rotating means provided on the stopper so as to extend outwardly through the space between the inner member and the lower plate for turning the stopper, the outer cylinder being formed with at least two circumferentially arranged supported surfaces, each provided at a different level from the other so as to face the respective downward movement restricting portion of the stopper, the stopper being turnably and airtightly mounted between the inner member and the lower plate, whereby the downward movement restricting portion is moved from a position facing one of the supported surfaces to a position facing another of the supported surfaces when the stopper is turned by a predetermined angle.

With this air spring, the restriction of lowering of the outer cylinder by the stopper is preferably carried out at a plurality of points. In order to prevent undue rotation of the stopper due to vibrations, it is preferable to provide a disengagable rotation preventive means for preventing rotation of the stopper by engaging the stopper turning portion at a front and a rear position of rotation of the stopper.

If the circumferentially arranged supported surfaces comprise a first and a second surface, when the stopper is rotated so that the movement restricting surface of the stopper moves from the position where it faces the first surface to the position where it faces the second surface, the compression stroke changes from S to (S−h), where h is the difference in height between the first and second surfaces. The upper limit of the compression stroke after the stopper has been rotated returns to S if the height of the air spring is increased by h. Thus, after the tread of the wheel has been reground such that the car height decreases by h, it is possible to reincrease the car height to the original level by increasing the height of the air spring and to absorb any increase in the compression stroke due to an increase in the height of the air spring by turning the stopper. This eliminates the need for an external shim for increasing the height of the mouting surface.

Also, according to this invention, since the stopper is provided with an outwardly protruding stopper turning portion, the stopper can be turned from outside. Thus, there is no need to dismount the air spring from the chassis to turn the stopper.

Other features and objects of the present invention will become apparent from the following description made with reference to the accompanying drawings, in which:

DETAILED DESCRIPTION OF THE PREFERRED EMBODIMENT

Figure 1:
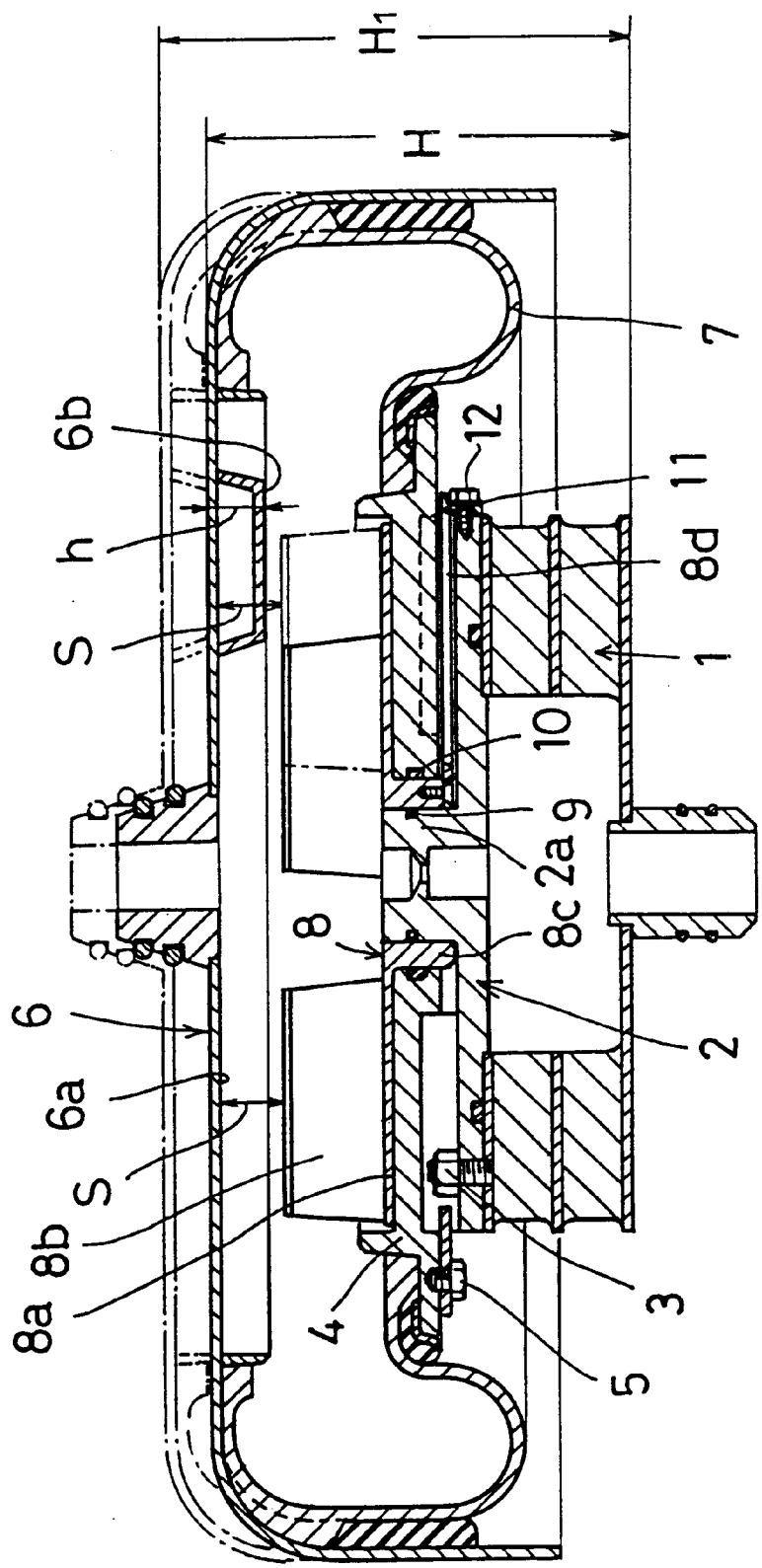
FIG. 1 is a sectional view of an air spring embodying this invention.
Figure 2:
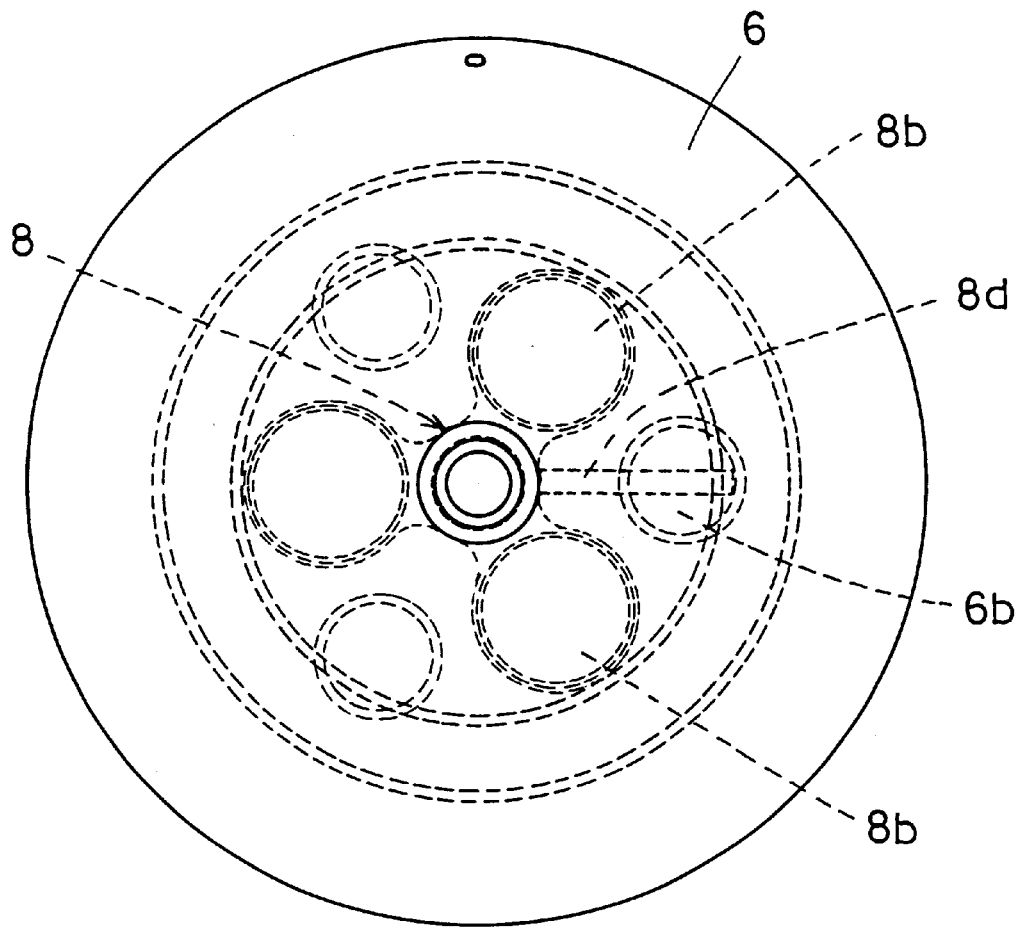
FIG. 2 is a plan view of the same.

FIGS. 1–4 show an air spring embodying this invention.

The air spring is comprised of a rubber laminate 1 which is to be mounted on a chassis of a car, a lower plate 2 secured to the top of the laminate 1 by bolt/nut means 3, an inner member 4 mounted on the lower plate 2 by bolts 5, an outer cylinder 6 which is to be mounted on the body of the car, a rubber bellows 7 having its bottom and top ends airtightly coupled to the inner member 4 and the outer cylinder 6, respectively, and a stopper 8 provided in the bellows 7 and supported by the inner member 4.

The stopper 8 comprises a base 8a, and protrusions 8b having a surface for restricting the downward movement of the outer cylinder 6. (The protrusion in this embodiment is a rubber pad covered with a protective plate.) The lower plate 2 has at its center an upwardly extending cylindrical shaft portion 2a received in a central bore formed in the inner member 4.

The stopper 8 has at its center a downwardly extending cylindrical protrusion 8c loosely received between the cylindrical shaft portion 2a and the bore of the inner member 4. The base 8a rests on a flat top surface of the inner member 4 and is rotatable about the shaft portion 2a. O-rings 9 and 10 airtightly close the gaps between the shaft portion 2a and the cylindrical protrusion 8c and between the cylindrical portion 8c and the inner member 4, respectively.

Figure 3:
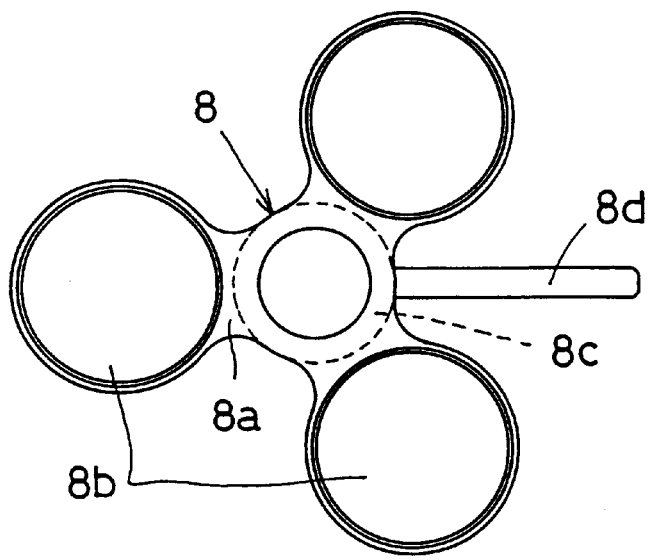
FIG. 3 is a plan view of the stopper.

As best shown in FIG. 3, a lever 8d extends radially outwardly from the bottom end of the cylindrical portion 8c through the gap between the inner member 4 and the lower plate 2.

Figure 4:
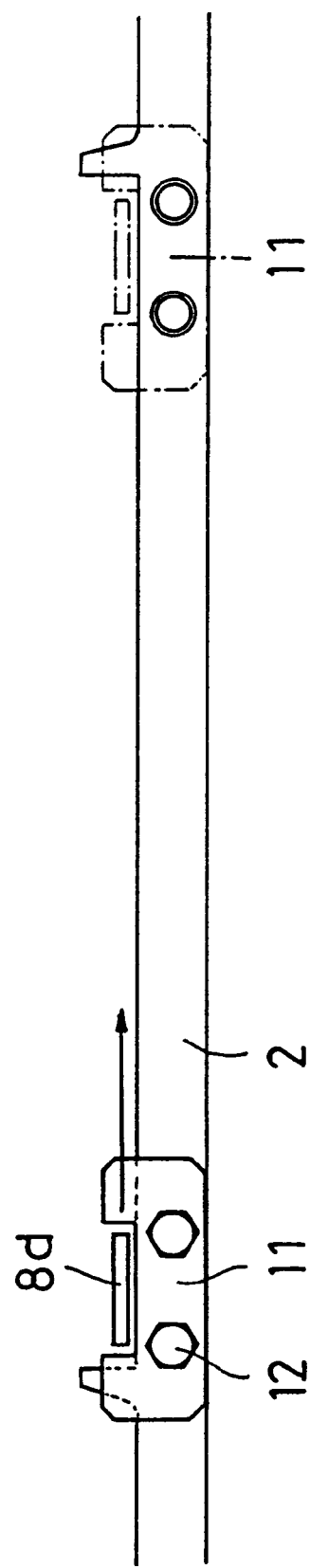
FIG. 4 is a developed side view showing a mounting portion of the stopper plate.

A stopper plate 11 is in engagement with the lever 8d, preventing the movement of the lever 8d. The stopper plate 11 is detachably mounted on the lower plate 2 by bolts 12. As shown in FIG. 4, its mounting position can be changed from the starting (solid line) to terminal (chain line) point of movement of the lever 8d. Thus, the single stopper plate 11 can prevent the rotation of the stopper 8 at two points.

The protrusions 8b of the stopper 8 restrict the downward movement of the outer cylinder 6. In the embodiment, three protrusions 8b are provided at angular intervals of 120 degrees. But more than three protrusions may be provided at equal intervals.

Corresponding to the protrusions 8b, the outer cylinder 6 has first surfaces 6a supported on the respective protrusions 8b, and second surfaces 6b provided circumferentially alternating with the first surfaces 6a at a level lower than the first surfaces 6a by a predetermined amount h (FIG. 1).

The numbers of the first surfaces 6a, second surfaces 6b and protrusions 8b are the same. Before the stopper 8 is turned, the protrusions 8b are arranged opposite the respective first surfaces 6a. When the stopper 8 is turned by a predetermined angle, the protrusions 8b face the second surfaces 6b.

If the tread of each car wheel to which the air spring of the invention is ground to such an extent that the height of the car decreases by an amount h, the air spring is inflated to increase its height from H to H1 (H1=H+h), and the lever 8d is moved to turn the stopper 8 by a predetermined angle (60° in the figures) so that the second surfaces 6b are supported on the protrusions 8b. Thus, after car height adjustment, the compression stroke of the air spring is maintained at a value S before car height adjustment.

Figure 5:
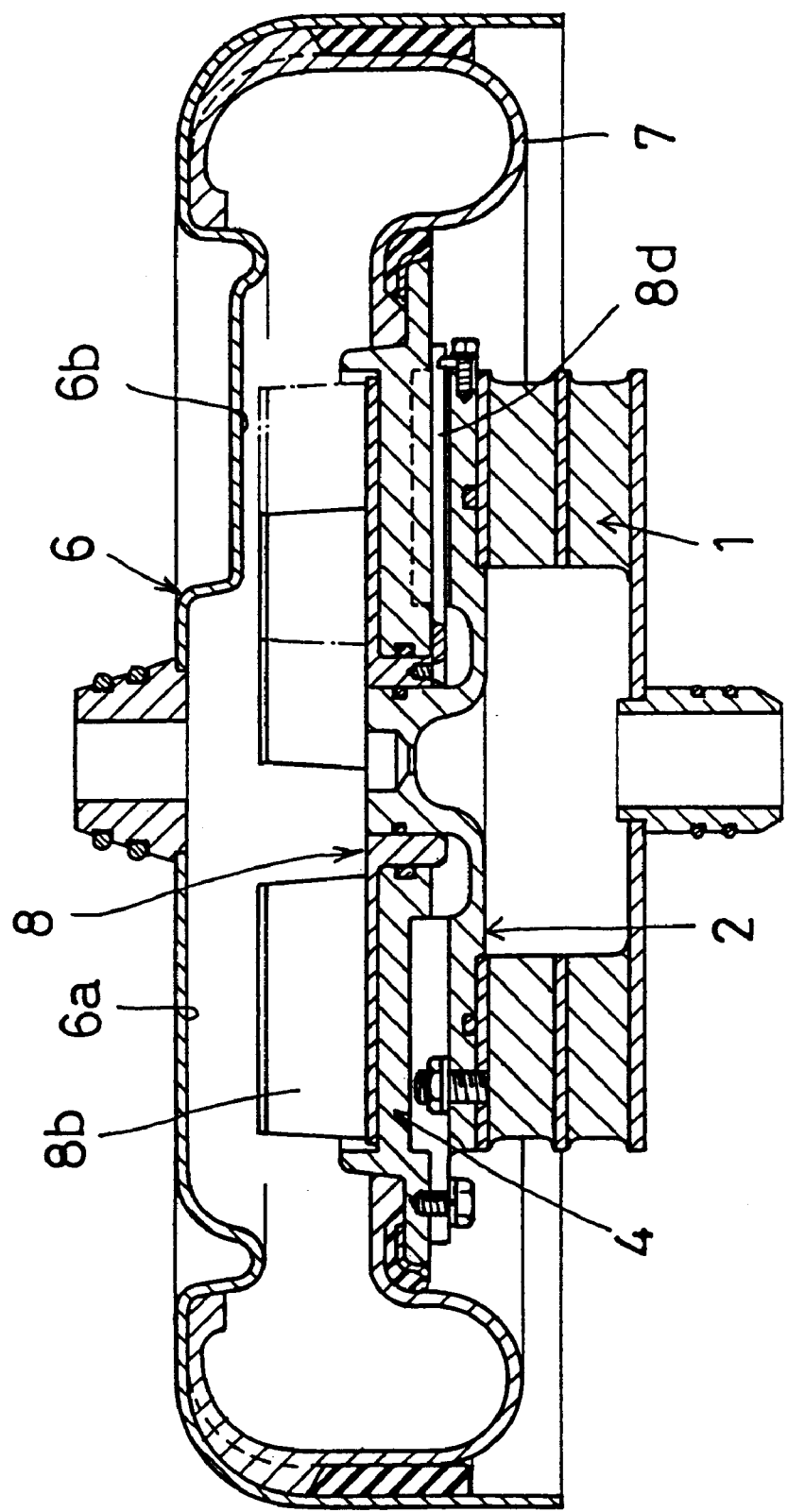
FIG. 5 is a sectional view of another air spring embodying the invention.
Figure 6:
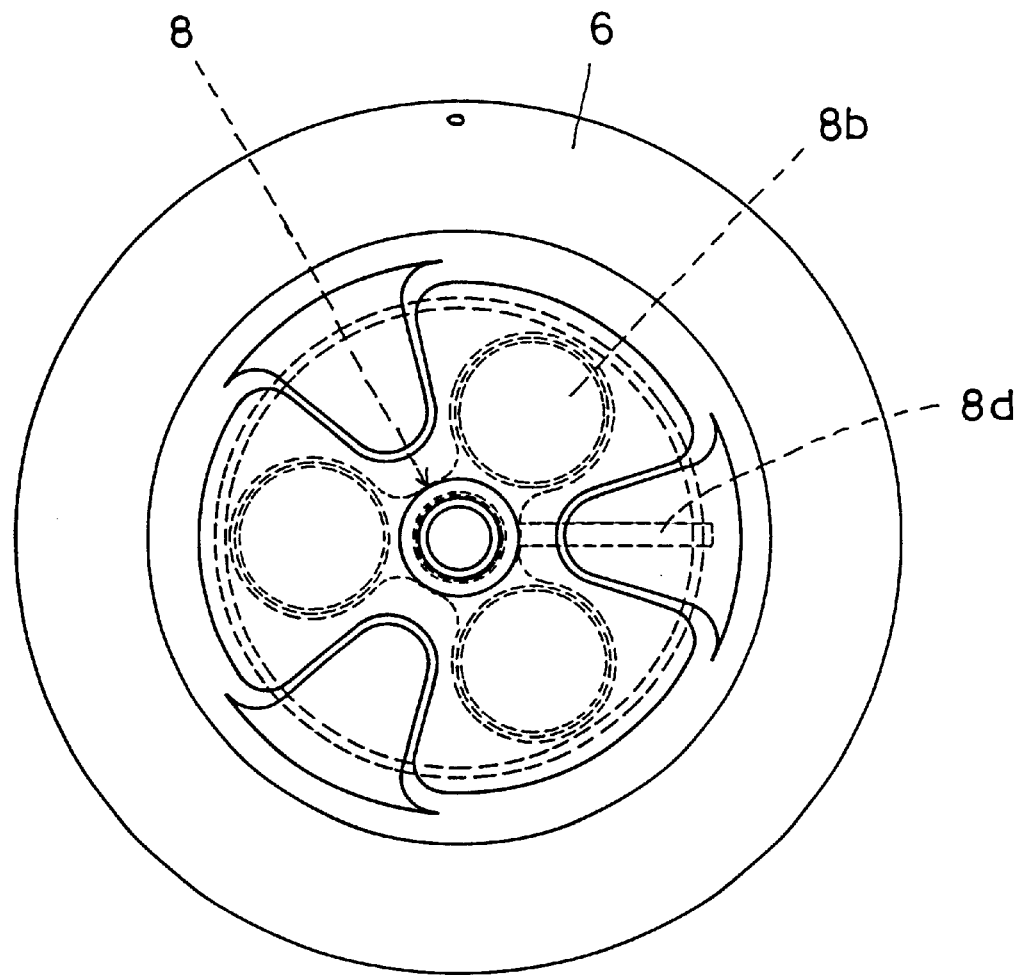
FIG. 6 is a plan view of the air spring of FIG. 5.

In FIG. 1, the second surfaces 6b are formed in a separate member mounted on the inner surface of the outer cylinder 6, but they may be formed directly in the outer cylinder 6 as shown in FIGS. 5 and 6.

The number of the protrusions 8b may be reduced from three to one.

Figure 7:
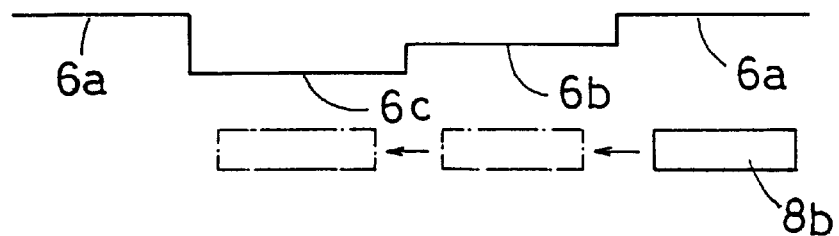
FIG. 7 is a developed diagram showing the relationship between the first to third supported surfaces and the stopper.

Third surfaces (6c in FIG. 7) and optionally fourth surfaces (not shown) may be provided at levels lower than the second and third surfaces, respectively, so that the car height adjustment can be made in a plurality of steps.

As described above, according to this invention, an increase in the compression stroke when its height is increased by a predetermined amount can be cancelled out by turning the stopper. Thus, it is possible to maintain a constant compression stroke without using a shim after car height adjustment.

What is claimed is:

1. An air spring comprising an inner member, an outer cylinder, a bellows provided between said inner member and said outer cylinder, a stopper provided in said bellows and supported on said inner member and having a downward movement restricting portion for restricting the downward movement of said outer cylinder, a lower plate supporting said inner member, a rotating means provided on said stopper so as to extend outwardly through a space between said inner member and said lower plate for turning said stopper, said outer cylinder being formed with at least two circumferentially arranged supported surfaces, each provided at a different level from the other so as to face said respective downward movement restricting portion of said stopper, said stopper being turnably and airtightly mounted between said inner member and said lower plate, whereby said downward movement restricting portion is moved from a position facing one of said supported surfaces to a position facing another of said supported surfaces when said stopper is turned by a predetermined angle.

2. An air spring as claimed in claim 1 wherein said stopper has a plurality of downward movement restricting portions circumferentially arranged at angular intervals, said supported surfaces on said outer cylinder being provided in a plurality of groups, each group comprising a plurality of said supported surfaces regularly arranged circumferentially.

3. An air spring as claimed in claim 1 further comprising a rotation preventive means for preventing the rotation of said stopper by disengageably engaging said stopper at positions before and after said stopper has been turned.

* * * * *